E. V. RENO & J. A. C. BOIS.
OIL PUMP.
APPLICATION FILED FEB. 2, 1914.
1,135,617.
Patented Apr. 13, 1915.
2 SHEETS—SHEET 2.
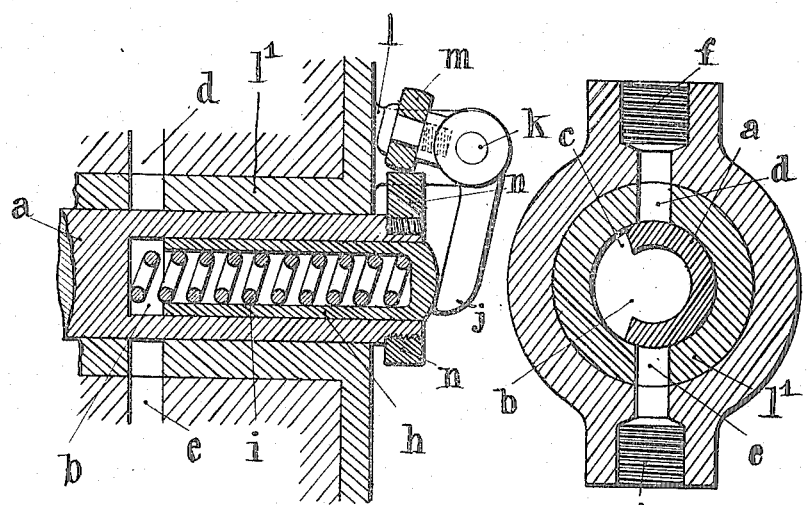
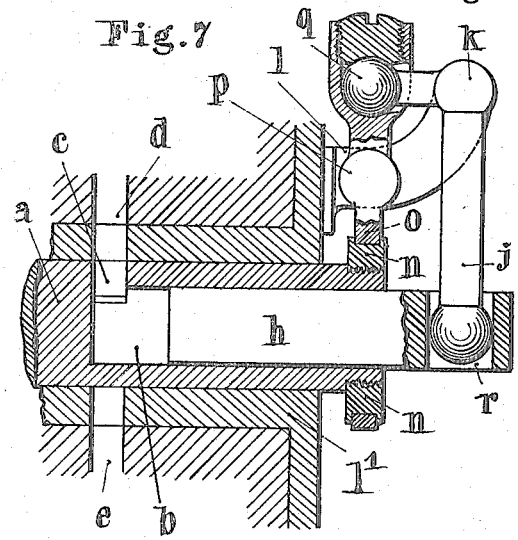
WITNESSES
Alfred R. Anderson
Cornelius Hoving
INVENTORS
E. V. RENO AND J. A. C. BOIS
BY Hvam Oldenmul
ATTORNEY

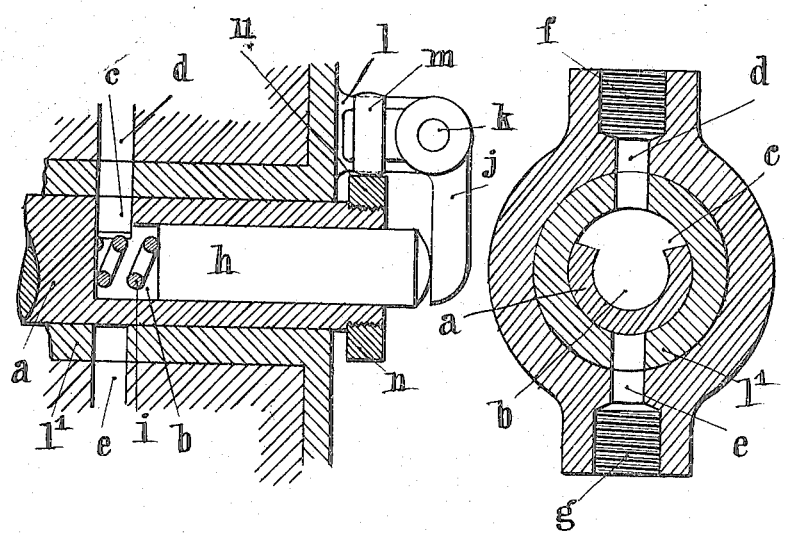

UNITED STATES PATENT OFFICE.

EMILE VICTOR RENO AND JOSEPH ALFRED CHRYSOSTOME BOIS, OF SOMME, FRANCE.

OIL-PUMP.

1,135,617.  Specification of Letters Patent.  Patented Apr. 13, 1915.

Application filed February 2, 1914. Serial No. 816,022.

*To all whom it may concern:*

Be it known that we, EMILE VICTOR RENO and JOSEPH ALFRED CHRYSOSTOME BOIS, residing at 58 Rue St. Fuscien à Amiens, Somme, France, have invented a certain new and useful Oil-Pump, of which the following is a specification.

The present invention has for its object a pump for oil or other liquid or gaseous fluids, its cylinder being constituted by the extremity of a rotary shaft which is perforated for this purpose. This shaft is provided with a recess, which, owing to its rotation, alternately comes opposite a suction orifice in communication with the oil reservoir and a second or delivery orifice which conducts the oil to the member to be lubricated. The piston that is displaced in the cylinder thus constituted is driven by a cam keyed upon the extremity of the rotary shaft in which the cylinder is formed. As a result of this arrangement the delivery from the pump is automatically regulated in accordance with the speed of rotation of the shaft.

Two embodiments of the invention are illustrated by way of example in the accompanying drawing, in which:

Figure 1 is a longitudinal elevation partly in section of the pump at the end of the suction period. Fig. 2 is a cross-section thereof through the suction and delivery orifices. Fig. 3 is an end elevation of the driving cam. Fig. 4 is an end elevation. Fig. 5 is a longitudinal section of the device at the moment at which the two orifices are closed. Fig. 6 is a cross section, and Fig. 7 illustrates a modified construction.

The apparatus illustrated in Figs. 1 to 6 comprises the rotary shaft $a$ bored with a cylindrical hole $b$ constituting the cylinder of the pump and provided with an orifice $c$ intended to place the interior of the cylinder $b$ in communication with the orifices $d$ and $e$ for suction and delivery respectively. The orifice $d$ may be connected with the oil reservoir by a tube which is also fixed to the socket $f$, while the orifice $e$ conducts the oil to the member to be lubricated by the intermediary of a tube fixed to a socket $g$. In the interior of the cylinder $b$ is arranged a piston $h$ inside which is arranged a spiral spring $i$ which causes this piston to bear constantly against a lever $j$ pivoted at $k$ upon a fixed support $l$ integral with a sleeve $l'$ perforated with orifices $d$ and $e$ and in which the extremity of the shaft $a$ rotates. The lever $j$ is integral with a roller $m$ running upon a cam $n$ fixed by any convenient means to the extremity of the rotary shaft $a$; under the influence of the spring $i$, this roller is constantly held in contact with the cam $n$.

Operation: When the shaft $a$ rotates, the cam $n$ which is fixed upon and rotates with it, acts upon the roller $m$ in conjunction with the spring $i$ in such a manner as to impart to the piston $h$ a reciprocating movement in the cylinder $b$ in order to produce a suction period and a delivery period; it is therefore only necessary to cause these periods to correspond alternately with the orifices $d$ and $e$ by the intermediary of the orifice $c$ formed in the end of the cylinder $b$, which, as stated above, is constituted by the shaft $a$. This pump can be utilized for creating pressure in a chamber or crank case containing the drive for the pump and into which the oil is delivered for distribution to the members to be lubricated. When the pressure in this chamber, which acts upon the outer end of the piston, becomes greater than the force of the spring $i$, the piston is immobilized. In this manner the pressure in the delivery is regulated.

In the modified construction illustrated in Fig. 7 the pump comprises no spring all the control members being connected one with the other. In this case the cam $n$ carries a collar $o$ which is connected with the pivoted lever $j$ by means of a rod $p$ in which is engaged a ball joint $q$ carried by the short arm of the lever $j$ pivoted at $k$. The end of the long arm of the lever $j$ is engaged in a groove $r$ cut in the piston in such a manner as to obtain automatic action of the pump.

The pump that has been described is not only applicable to the distribution of lubricating oil to one or more given points served by the same pump, but also for all liquid or gaseous fluids.

The novel form of pump that has just been described renders unnecessary the employment of valves which are uncertain in their operation at high speeds, thereby preventing the pump from acting. It facilitates the arrangement or the location of the oil reservoir because it is not necessary to fetch or flood this pump in order to insure a supply from it.

Claim:

In combination, a member having a bore therein and a pair of orifices communicating with the bore; a rotary shaft in said bore and having longitudinally in its end a hole having a lateral orifice adapted to register with either one of the orifices of said member; a piston in said hole; an eccentric on said shaft; and an elbow lever adapted to engage and be oscillated by said eccentric and to engage and reciprocate said piston.

In testimony whereof we affix our signatures in presence of two witnesses.

EMILE VICTOR RENO.
JOSEPH ALFRED CHRYSOSTOME BOIS.

Witnesses:
MAURICE PICARD,
HANSON C. COXE.

Copies of this patent may be obtained for five cents each, by addressing the "Commissioner of Patents, Washington, D. C."